United States Patent
Torita et al.

(10) Patent No.: US 10,784,515 B2
(45) Date of Patent: Sep. 22, 2020

(54) POSITIVE ELECTRODE PLATE AND NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Koji Torita, Nagoya (JP); Akihiro Ochiai, Toyonaka (JP); Yusuke Fukumoto, Toyonaka (JP); Harunari Shimamura, Toyonaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 98 days.

(21) Appl. No.: 16/120,507

(22) Filed: Sep. 4, 2018

(65) Prior Publication Data

US 2019/0115598 A1    Apr. 18, 2019

(30) Foreign Application Priority Data

Oct. 13, 2017 (JP) .................................. 2017-199197

(51) Int. Cl.
- *H01M 4/62*      (2006.01)
- *H01M 10/42*     (2006.01)
- *H01M 10/05*     (2010.01)
- *H01M 4/02*      (2006.01)

(52) U.S. Cl.
CPC ........... *H01M 4/628* (2013.01); *H01M 10/05* (2013.01); *H01M 10/4235* (2013.01); *H01M 2004/028* (2013.01)

(58) Field of Classification Search
CPC ........ H01M 4/62; H01M 4/628; H01M 10/05; H01M 10/4235; H01M 2004/028
See application file for complete search history.

(56) References Cited

U.S. PATENT DOCUMENTS

| | | | | |
|---|---|---|---|---|
| 8,349,501 | B2 * | 1/2013 | Taniguchi ............. | H01M 4/131 429/231.9 |
| 2015/0179998 | A1 | 6/2015 | Kagami et al. | |
| 2015/0349344 | A1 * | 12/2015 | Shelekhin ............... | H01M 4/62 429/90 |
| 2015/0364760 | A1 * | 12/2015 | Park ...................... | H01M 4/505 429/221 |
| 2016/0372853 | A1 * | 12/2016 | Kono ................... | C08L 53/025 |

FOREIGN PATENT DOCUMENTS

| | | | |
|---|---|---|---|
| CN | 106558701 A | * | 4/2017 |
| JP | 11-307081 A | * | 11/1999 |
| JP | 2010-251217 A | | 11/2010 |
| JP | 2015-118841 A | | 6/2015 |
| SU | 256762 | * | 12/1969 |

OTHER PUBLICATIONS

Machine translation of JP 11-307081A, published on Nov. 5, 1999 (Year: 1999).*
Machine translation of the abstract of CN 106558701A, published on Apr. 5, 2017 (Year: 2017).*
Machine translation of the description of CN 106558701A, published on Apr. 5, 2017 (Year: 2017).*
Machine translation of the claims of CN 106558701A, published on Apr. 5, 2017 (Year: 2017).*
Machine translation of SU 256762, published on Dec. 31, 1969 (Year: 1969).*

* cited by examiner

*Primary Examiner* — Anca Eoff
(74) *Attorney, Agent, or Firm* — Sughrue Mion, PLLC

(57) ABSTRACT

A positive electrode plate includes a positive electrode composite material layer. The positive electrode composite material layer contains at least a positive electrode active material and a flame retardant. The flame retardant contains phosphorus (P) or sulfur (S). The flame retardant has a thermal decomposition temperature not lower than 80° C. and not higher than 210° C. A value calculated by dividing a porosity (%) of the positive electrode composite material layer by an amount (mass %) of P and S contained in the positive electrode composite material layer is not smaller than 5 and not greater than 5000.

4 Claims, 3 Drawing Sheets

POSITIVE ELECTRODE PLATE AND NON-AQUEOUS ELECTROLYTE SECONDARY BATTERY

This nonprovisional application is based on Japanese Patent Application No. 2017-199197 filed with the Japan Patent Office on Oct. 13, 2017, the entire contents of which are hereby incorporated by reference.

BACKGROUND

Field

The present disclosure relates to a positive electrode plate and a non-aqueous electrolyte secondary battery.

Description of the Background Art

Japanese Patent Laying-Open No. 2010-251217 discloses containing a flame retardant such as melamine polyphosphate (MPP) in a positive electrode composite material layer of a lithium secondary battery.

SUMMARY

A positive electrode active material contained in a positive electrode has been demanded to be higher in capacity while increase in resistance of a battery is suppressed. A higher capacity of the positive electrode active material can be achieved, for example, by increasing a ratio of Ni in the positive electrode active material expressed as ($LiNi_aCo_bMn_cO_2$ (where a+b+c=1)).

With increase in ratio of Ni, however, a thermal decomposition temperature of the positive electrode active material lowers. Therefore, the thermal decomposition temperature of the positive electrode active material tends to be lower than the thermal decomposition temperature of a flame retardant such as MPP. The "thermal decomposition temperature of the flame retardant" herein means a temperature at which decrease in weight of the flame retardant starts and the "thermal decomposition temperature of the positive electrode active material" means a temperature at which decrease in weight of the positive electrode active material starts. Such a thermal decomposition temperature can be measured, for example, with thermal gravity-differential thermal analysis (TG-DTA).

When the thermal decomposition temperature of the positive electrode active material is lower than the thermal decomposition temperature of the flame retardant, the positive electrode active material is considered to thermally be decomposed at a temperature lower than a temperature at which the flame retardant is thermally decomposed on the occurrence of an abnormality (for example, when a nail is driven). Therefore, it is considered that thermal decomposition of the positive electrode active material and heat generation by the positive electrode active material cannot be suppressed. Namely, in Japanese Patent Laying-Open No. 2010-251217 in which MPP is employed as the flame retardant, there is a room for improvement in suppression of increase in temperature of the battery at least on the occurrence of an abnormality.

An object of the present disclosure is to achieve both of suppression of increase in temperature of a battery on the occurrence of an abnormality and suppression of increase in resistance of the battery during normal use.

Technical features and functions and effects of the present disclosure will be described below. A functional mechanism of the present disclosure, however, includes presumption. The scope of claims should not be limited by whether or not the functional mechanism is correct.

[1] A positive electrode plate in the present disclosure is a positive electrode plate for a non-aqueous electrolyte secondary battery. The positive electrode plate includes a positive electrode composite material layer. The positive electrode composite material layer contains at least a positive electrode active material and a flame retardant. The flame retardant contains phosphorus (P) or sulfur (S). The flame retardant has a thermal decomposition temperature not lower than 80° C. and not higher than 210° C. A value calculated by dividing a porosity (%) of the positive electrode composite material layer by an amount (mass %) of P and S contained in the positive electrode composite material layer is not smaller than 5 and not greater than 5000.

The positive electrode plate in the present disclosure contains a flame retardant. The flame retardant contains phosphorus (P) or sulfur (S) and has a thermal decomposition temperature not lower than 80° C. and not higher than 210° C. Therefore, the flame retardant is considered as being lower in thermal decomposition temperature than the positive electrode active material.

As set forth above, a thermal decomposition temperature of the flame retardant contained in the positive electrode plate in the present disclosure is not lower than 80° C. and not higher than 210° C. Therefore, a flame retardant mechanism attributed to the flame retardant is considered to be activated before the positive electrode active material is thermally decomposed. Specifically, the flame retardant is thermally decomposed at a temperature not lower than 80° C. and not higher than 210° C. It is thus considered that P and S contained in the flame retardant (which are also simply denoted as "P and S" below) are dispersed in an electrolyte solution of the non-aqueous electrolyte secondary battery. It is considered that P and S dispersed in the electrolyte solution contribute to dehydration of the electrolyte solution and water is generated in the electrolyte solution. It is expected that generated water evaporates, the battery is cooled by latent heat at the time of evaporation, and increase in temperature of the battery is suppressed. Namely, it is expected that suppression of increase in temperature of the battery on the occurrence of an abnormality is achieved.

In the positive electrode plate in the present disclosure, a value calculated by dividing a porosity (%) of the positive electrode composite material layer by an amount (mass %) of P and S contained in the positive electrode composite material layer is not smaller than 5 and not greater than 5000. Suppression of increase in resistance of the battery is expected by thus controlling relation between the porosity (%) of the positive electrode composite material layer and an amount (mass %) of P and S contained in the positive electrode composite material layer. In addition, it is expected that the thermally decomposed flame retardant is efficiently dispersed in the electrolyte solution held in pores in the positive electrode composite material layer. It is thus expected that suppression of increase in temperature of the battery on the occurrence of an abnormality and suppression of increase in resistance of the battery during normal use are both achieved.

[2] The positive electrode plate may contain as the flame retardant, at least one selected from the group consisting of diammonium phosphate, guanidine sulfamate, ammonium sulfamate, (($C_4H_9)_3PO$), and (HO—$C_3H_6)_3PO$. It is expected that, when such a flame retardant is employed, suppression of increase in temperature of the battery on the occurrence of an abnormality is noticeably achieved.

[3] A non-aqueous electrolyte secondary battery in the present disclosure includes at least the positive electrode plate in [1] or [2]. The non-aqueous electrolyte secondary battery in the present disclosure is expected to achieve both of suppression of increase in temperature of the battery on the occurrence of an abnormality and suppression of increase in resistance of the battery during normal use.

[4] The non-aqueous electrolyte secondary battery in the present disclosure may contain an electrolyte solution. Suppression of a temperature by P and S described above is expected to effectively function in the non-aqueous electrolyte secondary battery in the present disclosure.

[5] The non-aqueous electrolyte secondary battery in the present disclosure may satisfy a relational expression of $10 \leq X-Y \leq 140$ where X represents a thermal decomposition end temperature of the electrolyte solution and Y represents a thermal decomposition temperature of the flame retardant. It is thus expected that both of suppression of increase in temperature of the battery on the occurrence of an abnormality and suppression of increase in resistance of the battery during normal use are noticeably achieved.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure (which is herein also denoted as the "present embodiment") will be described below. The description below, however, does not limit the scope of claims.

A lithium ion secondary battery will be described below by way of example of a non-aqueous electrolyte secondary battery. The non-aqueous electrolyte secondary battery in the present embodiment should not be limited to the lithium ion secondary battery. The non-aqueous electrolyte secondary battery in the present embodiment can also be, for example, a sodium ion secondary battery. The non-aqueous electrolyte secondary battery is also simply denoted as a "battery" below.

<Non-Aqueous Electrolyte Secondary Battery>

Figure 1:
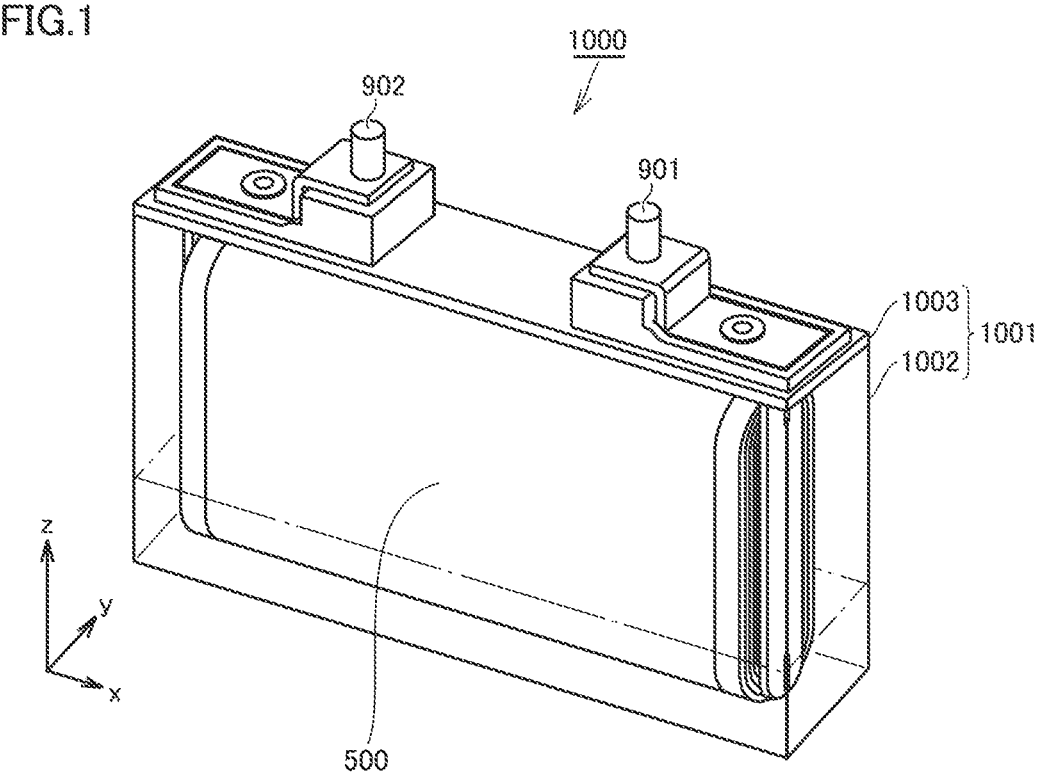
FIG. 1 is a schematic diagram showing one example of a construction of a non-aqueous electrolyte secondary battery in the present embodiment.

FIG. 1 is a schematic diagram showing one example of a construction of a non-aqueous electrolyte secondary battery in the present embodiment. An outer geometry of a battery 1000 is in a form of a parallelepiped of a flat profile. Namely, battery 1000 is a battery in a prismatic shape. The battery in the present embodiment should not be limited to the battery in the prismatic shape. The battery in the present embodiment may be, for example, a battery in a cylindrical shape.

«Case»

Battery 1000 includes a case 1001. Case 1001 is hermetically sealed. Case 1001 can be made, for example, of an aluminum (Al) alloy. So long as case 1001 can hermetically be sealed, the case may be a pouch made of an Al laminated film. Namely, the battery in the present embodiment may be a laminate-type battery.

Case 1001 includes a container 1002 and a lid 1003. Lid 1003 is joined to container 1002, for example, with laser welding. A positive electrode terminal 901 and a negative electrode terminal 902 are provided in lid 1003. Though not shown, lid 1003 may further be provided with a liquid introduction port, a gas exhaust valve, and a current interrupt device (CID).

Case 1001 accommodates an electrode group 500 and an electrolyte solution (not shown). A chain dotted line in FIG. 1 shows a liquid level of the electrolyte solution. Electrode group 500 is impregnated also with the electrolyte solution. Namely, the electrolyte solution is present also in the inside of electrode group 500.

«Electrode Group»

Figure 2:
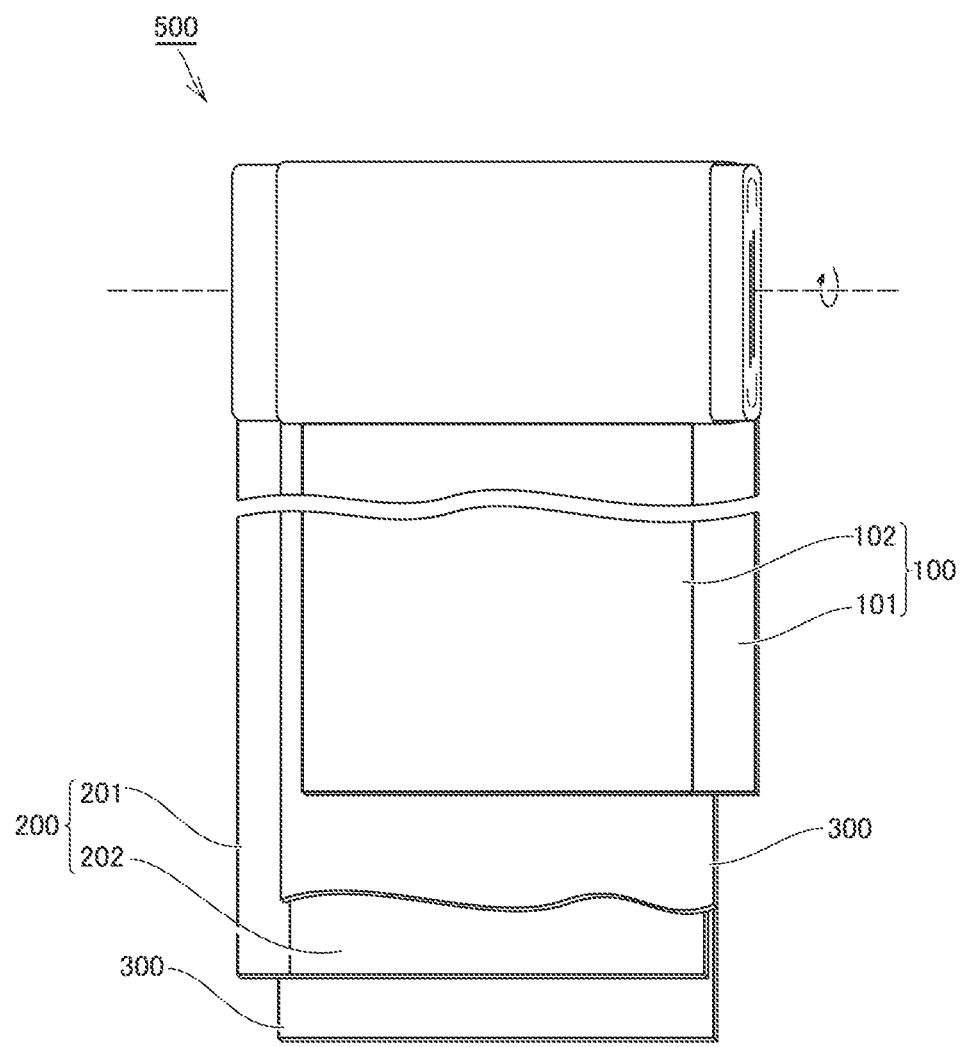
FIG. 2 is a schematic diagram showing one example of a construction of an electrode group in the present embodiment.

FIG. 2 is a schematic diagram showing one example of a construction of the electrode group in the present embodiment. Electrode group 500 is of a wound type. Electrode group 500 is formed by stacking a positive electrode plate 100, a separator 300, a negative electrode plate 200, and separator 300 in this order and further spirally winding the same. The electrode group in the present embodiment should not be limited to the wound type. The electrode group in the present embodiment may be of a stack (layered) type. The electrode group of the stack type can be formed, for example, by alternately stacking the positive electrode and the negative electrode with the separator lying between the positive electrode and the negative electrode.

<Positive Electrode Plate>

Figure 3:
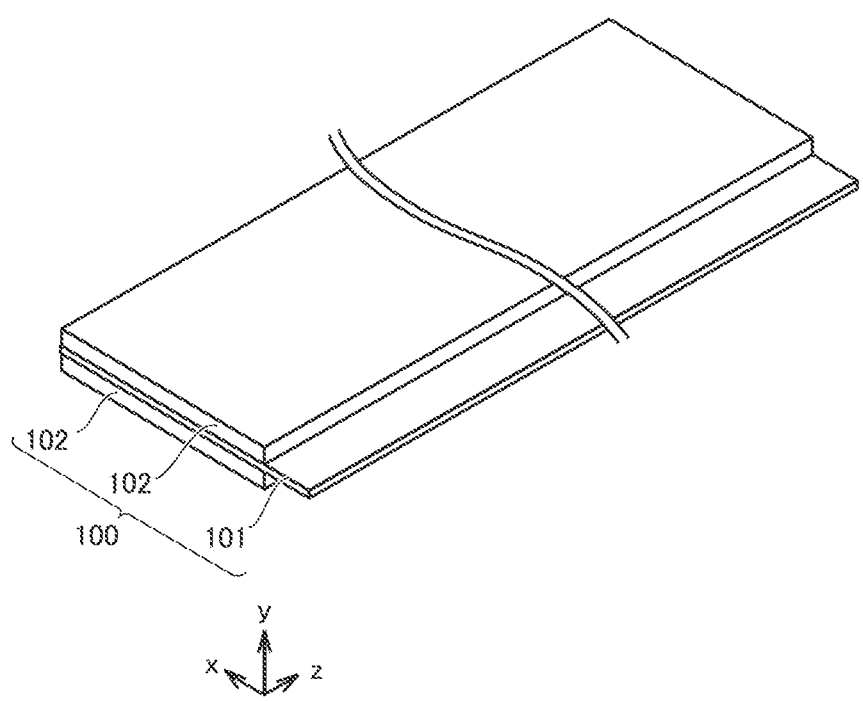
FIG. 3 is a schematic diagram showing one example of a construction of a positive electrode plate in the present embodiment.

FIG. 3 is a schematic diagram showing one example of a construction of the positive electrode plate in the present embodiment for a non-aqueous electrolyte secondary battery. Battery 1000 includes at least positive electrode plate 100 and an electrolyte solution. Positive electrode plate 100 is a sheet in a form of a band. Positive electrode plate 100 includes a positive electrode composite material layer 102 and a positive electrode current collector 101. Namely, positive electrode plate 100 includes positive electrode composite material layer 102. Positive electrode current collector 101 is electrically connected to positive electrode terminal 901. Positive electrode current collector 101 may be, for example, an Al foil or an Al-alloy foil. Positive electrode current collector 101 may have a thickness, for example, not smaller than 5 μm and not greater than 50 μm. A portion of positive electrode current collector 101 protruding from positive electrode composite material layer 102 in a direction of the x axis in FIG. 3 can be used for connection to positive electrode terminal 901 (FIG. 1).

«Positive Electrode Composite Material Layer»

Positive electrode composite material layer 102 is formed on a surface of positive electrode current collector 101. Positive electrode composite material layer 102 may be formed on both of front and rear surfaces of positive electrode current collector 101. Positive electrode composite material layer 102 may have a thickness, for example, not smaller than 10 μm and not greater than 200 μm. «Composition of Positive Electrode Composite Material Layer»

Positive electrode composite material layer 102 contains a positive electrode active material, a conductive material, a binder, and a flame retardant. Namely, positive electrode composite material layer 102 contains at least a positive electrode active material and a flame retardant.

(Positive Electrode Active Material)

Positive electrode active material particles electrochemically occlude and release charge carriers (lithium ions in the present embodiment). The positive electrode active material should not particularly be limited. The positive electrode active material may be, for example, $LiCoO_2$, $LiNiO_2$, $LiNi_{1/3}Co_{1/3}Mn_{1/3}O_2$ (NCM), $LiNi_{0.8}Co_{0.15}Al_{0.05}O_2$ (NCA), $LiMnO_2$, $LiMn_2O_4$, or $LiFePO_4$. Two or more types of positive electrode active materials may be used as being combined.

(Flame Retardant)

The flame retardant contains phosphorus (P) or sulfur (S). The flame retardant has a thermal decomposition temperature not lower than 80° C. and not higher than 210° C. The thermal decomposition temperature of the flame retardant is desirably not lower than 110° C. and not higher than 190° C.

When the thermal decomposition temperature of the flame retardant is close to a temperature region in which the battery can be used (for example, 60° C.), the flame retardant may thermally be decomposed in the temperature region where the battery can be used and a resistance of the battery may increase. Therefore, the flame retardant has a thermal decomposition temperature not lower than 80° C. and desirably not lower than 110° C. When the flame retardant has a high thermal decomposition temperature (for example, 300° C.), the positive electrode active material is thermally decomposed before the flame retardant is thermally decomposed, and the positive electrode active material may generate heat. In particular, a positive electrode active material abundantly containing Ni has a thermal decomposition temperature lower than 300° C. Therefore, from a point of view of prevention of thermal decomposition of the positive electrode active material before the flame retardant, the flame retardant has a thermal decomposition temperature not higher than 210° C. and desirably not higher than 190° C.

The flame retardant contains phosphorus (P) or sulfur (S), and it is not particularly restricted so long as it has a thermal decomposition temperature not lower than 80° C. and not higher than 210° C. The flame retardant may be, for example, guanidine sulfamate, guanidine phosphate, guanylurea phosphate, diammonium phosphate, ammonium polyphosphate, ammonium sulfamate, bis(diphenyl phosphate), resorcinol bis(diphenyl phosphate), triisopropylphenyl phosphate, triphenyl phosphate, trimethyl phosphate, triethyl phosphate, tricresyl phosphate, tris(chloroisopropyl) phosphate, $((C_4H_9)_3PO)$, $(HO—C_3H_6)_3PO$, a phosphazene compound, diphosphorus pentoxide, or polyphosphoric acid. Such a flame retardant may be used alone or two or more types of flame retardants as being combined may be used.

The flame retardant is desirably at least one selected from the group consisting of diammonium phosphate, guanidine sulfamate, ammonium sulfamate, $(C_4H_9)_3PO$, and $(HO—C_3H_6)_3PO$. Such a flame retardant may be used alone or two or more types of flame retardants as being combined may be used.

(Conductive Material and Binder)

The conductive material and the binder should not particularly be limited. The conductive material may be, for example, acetylene black (AB), furness black, vapor-grown carbon fiber (VGCF), or graphite. The binder may be, for example, polyvinylidene difluoride (PVdF), styrene-butadiene rubber (SBR), or polytetrafluoroethylene (PTFE).

《Relation Between Porosity of Positive Electrode Composite Material Layer and Amount of P and S Contained in Positive Electrode Composite Material Layer》

A value (which is simply also denoted as "B/A" below) calculated by dividing a porosity B (%) of positive electrode composite material layer 102 by an amount A (mass %) of P and S contained in positive electrode composite material layer 102 is not smaller than 5 and not greater than 5000, desirably not smaller than 13 and not greater than 2500, and more desirably not smaller than 40 and not greater than 400.

It is considered that, when B/A is smaller than 5, the porosity is low and an amount of electrolyte solution present in pores in positive electrode composite material layer 102 is small. Therefore, an amount of electrolyte solution is considered as insufficient. Therefore, a resistance of battery 1000 may increase. It is considered that, when B/A exceeds 5000, the electrolyte solution contained in battery 1000 is excessive and an amount of flame retardant is insufficient with respect to the amount of electrolyte solution. Therefore, it is considered that an amount of dehydration of the electrolyte solution owing to decomposition of the flame retardant is insufficient and water generated in the electrolyte solution is insufficient. It is thus considered that an amount of water which evaporates on the occurrence of an abnormality is insufficient and latent heat is insufficient. Consequently, suppression of increase in temperature of the battery on the occurrence of an abnormality may be insufficient.

(Porosity (%) of Positive Electrode Composite Material Layer)

Positive electrode composite material layer 102 may have a porosity not lower than 20% and not higher than 60%. When positive electrode composite material layer 102 has a porosity lower than 20%, an amount of electrolyte solution held in pores in positive electrode composite material layer 102 is small. Therefore, an amount of electrolyte solution is insufficient and a resistance of battery 1000 may increase. It is considered that, when positive electrode composite material layer 102 has a porosity exceeding 60%, the electrolyte solution contained in battery 1000 is excessive and an amount (mass %) of flame retardant contained in battery 1000 is insufficient. Therefore, it is considered that an amount of dehydration of the electrolyte solution owing to decomposition of the flame retardant is insufficient and water generated in the electrolyte solution is insufficient. It is thus considered that an amount of water which evaporates on the occurrence of an abnormality is insufficient and latent heat is insufficient. Consequently, suppression of increase in temperature of the battery on the occurrence of an abnormality may be insufficient.

A porosity of positive electrode composite material layer 102 may be calculated, for example, in accordance with an expression (I) below:

$$(\text{Porosity}) = (V_L - V_p) \div V_L \qquad (I)$$

where $V_L$ represents an "apparent volume of positive electrode composite material layer 102" and $V_p$ represents a "true volume of positive electrode composite material layer 102." $V_L$ can be calculated based on $V_L = L \times W \times T$ where L represents a length dimension of the positive electrode composite material layer, W represents a width dimension thereof, and T represents a thickness dimension thereof. Thickness dimension T can be measured, for example, with an SEM. $V_p$ can be calculated by dividing a "mass of positive electrode composite material layer 102" by a "true density of a positive electrode composite material." A true density of the positive electrode composite material can be calculated from a true density of each material (a positive electrode active material, a conductive material, and a binder) forming the positive electrode composite material and a blending ratio of each material.

(Amount (mass %) of P and S Contained in Positive Electrode Composite Material Layer)

An amount of P and S contained in positive electrode composite material layer 102 may be, for example, not lower than 0.004 mass % and not higher than 12 mass %. When an amount of P and S in positive electrode composite material layer 102 is lower than 0.004 mass %, an amount of flame retardant is considered as insufficient. Therefore, it is considered that an amount of dehydration of the electrolyte solution owing to decomposition of the flame retardant is insufficient and water generated in the electrolyte solution is insufficient. It is thus considered that an amount of water which evaporates on the occurrence of an abnormality is insufficient and latent heat is insufficient. Consequently, suppression of increase in temperature of the battery on the occurrence of an abnormality may be insufficient. When a content of P and S in positive electrode composite material layer 102 exceeds 12 mass %, due to increase in flame retardant, a conduction path may be interfered and a resistance of the battery may increase.

An amount (mass %) of P and S contained in positive electrode composite material layer 102 may be measured, for example, as below. Initially, positive electrode plate 100 included in battery 1000 is cleaned with a solvent (for example, ethyl methyl carbonate) and thereafter dried. Dried positive electrode plate 100 is dissolved by using strong acid such as aqua regia to thereby obtain a solution. Metallic ions in the solution are quantified with an inductively coupled plasma (ICP) emission spectrometer. A weight of P and S contained in positive electrode composite material layer 102 is thus quantified. Then, an amount (mass %) of P and S contained in positive electrode composite material layer 102 can be calculated based on a weight of cleaned and dried positive electrode plate 100 and a weight obtained with ICP of P and S contained in positive electrode composite material layer 102.

<Negative Electrode Plate>

Negative electrode plate 200 is a sheet in a form of a band. Negative electrode plate 200 includes a negative electrode composite material layer 202 and a negative electrode current collector 201. Negative electrode current collector 201 is electrically connected to negative electrode terminal 902. Negative electrode current collector 201 may be, for example, a copper (Cu) foil. Negative electrode current collector 201 may have a thickness, for example, approximately from 5 to 20 µm. Negative electrode composite material layer 202 is formed on a surface of negative electrode current collector 201. Negative electrode composite material layer 202 may be formed on both of front and rear surfaces of negative electrode current collector 201.

«Negative Electrode Composite Material Layer»

Negative electrode composite material layer 202 contains a negative electrode active material and a binder. Negative electrode composite material layer 202 may contain, for example, 95 to 99 mass % of negative electrode active material and 1 to 5 mass % of binder. Negative electrode composite material layer 202 may have a thickness, for example, approximately from 50 to 150 µm.

(Negative Electrode Active Material and Binder)

The negative electrode active material and the binder should not particularly be limited. The negative electrode active material may be, for example, amorphous coated graphite (a graphite particle having a surface coated with amorphous carbon), graphite, soft carbon, hard carbon, silicon, silicon oxide, tin, or tin oxide. The binder may be, for example, carboxymethyl cellulose (CMC) or styrene-butadiene rubber (SBR).

<Separator>

Battery 1000 can include separator 300. Separator 300 is a film in a form of a band. Separator 300 is arranged between positive electrode plate 100 and negative electrode plate 200. Separator 300 may have a thickness, for example, not smaller than 5 µm and not greater than 30 µm. Separator 300 is porous. Separator 300 electrically isolates positive electrode plate 100 and negative electrode plate 200 from each other. Separator 300 may be composed, for example, of polyethylene (PE) or polypropylene (PP).

Separator 300 may have, for example, a single-layered structure. Separator 300 may be formed, for example, only of a porous film composed of PE. Separator 300 may have, for example, a multi-layered structure. Separator 300 may be formed, for example, by stacking a porous film composed of PP, a porous film composed of PE, and a porous film composed of PP in this order. Separator 300 may include a heat-resistant layer (HRL) on a surface thereof. The heat-resistant layer contains a heat-resistant material. The heat-resistant material may be, for example, alumina or polyimide.

<Electrolyte Solution>

Battery 1000 includes an electrolyte solution. The electrolyte solution contains at least lithium (Li) salt and a solvent. The electrolyte solution may contain, for example, at least 0.5 mol/l and at most 2 mol/l of Li salt. The Li salt is a supporting electrolyte. The Li salt is dissolved in the solvent. The Li salt may be, for example, $LiPF_6$, $LiBF_4$, $Li[N(FSO_2)_2]$, or $Li[N(CF_3SO_2)_2]$. One type of Li salt may be used alone. Two or more types of Li salt may be used as being combined.

The solvent is aprotic. Namely, the electrolyte solution in the present embodiment is a non-aqueous electrolyte. The solvent may be, for example, a mixture of cyclic carbonate and chain carbonate. A ratio of mixing may be set, for example, to "cyclic carbonate:chain carbonate=1:9 to 5:5 (at a volume ratio)."

Cyclic carbonate may be, for example, ethylene carbonate (EC), propylene carbonate (PC), butylene carbonate (BC), or fluoroethylene carbonate (FEC). One type of cyclic carbonate may be used alone. Two or more types of cyclic carbonate may be used as being combined.

Chain carbonate may be, for example, dimethyl carbonate (DMC), ethyl methyl carbonate (EMC), or diethyl carbonate (DEC). One type of chain carbonate may be used alone. Two or more types of chain carbonate may be used as being combined.

The solvent may include, for example, lactone, cyclic ether, chain ether, and carboxylate. Lactone may be, for example, γ-butyrolactone (GBL) or δ-valerolactone. Cyclic ether may be, for example, tetrahydrofuran (THF), 1,3-dioxolane, or 1,4-dioxane. Chain ether may be 1,2-dimethoxyethane (DME). Carboxylate may be, for example, methyl formate (MF), methyl acetate (MA), or methyl propionate (MP).

The electrolyte solution may further contain various functional additives in addition to the Li salt and the solvent. The electrolyte solution may contain, for example, at least 1 mass % and at most 5 mass % of functional additive. Examples of the functional additive include a gas generating agent (an overcharge additive) and a solid electrolyte interface (SEI) film forming agent. The gas generating agent may be, for example, cyclohexylbenzene (CHB) or biphenyl (BP). The SEI film forming agent may be, for example, vinylene carbonate (VC), vinyl ethylene carbonate (VEC), Li[B(C$_2$O$_4$)$_2$], LiPO$_2$F$_2$, propane sultone (PS), or ethylene sulfite (ES).

«Relation Between Thermal Decomposition End Temperature X of Electrolyte Solution and Thermal Decomposition Temperature Y of Flame Retardant»

A thermal decomposition end temperature X of the electrolyte solution and a thermal decomposition temperature Y of the flame retardant contained in positive electrode composite material layer 102 desirably satisfy a relational expression (1) below.

$$10 \leq X-Y \leq 140 \tag{1}$$

The "thermal decomposition end temperature of the electrolyte solution" herein means a temperature at which decrease in weight of the electrolyte solution converges, and it can be measured, for example, with TG-DTA.

When X−Y is smaller than 10, thermal decomposition end temperature X of the electrolyte solution is close to thermal decomposition temperature Y of the flame retardant. Therefore, the electrolyte solution is thermally decomposed on the occurrence of an abnormality such as a nail being driven. Therefore, the flame retardant may not sufficiently be dispersed in the electrolyte solution and heat generation by the battery cannot sufficiently be suppressed. When X−Y exceeds 140, thermal decomposition temperature Y of the flame retardant can be close to a temperature region where the battery can normally be used (for example, 60° C.). In such a case, the flame retardant may thermally be decomposed in the temperature region where the battery can normally be used, and a resistance of the battery may increase. From such a point of view, X−Y is desirably not smaller than 10 and not greater than 140, more desirably not smaller than 20 and not greater than 140, further desirably not smaller than 30 and not greater than 140, and particularly desirably not smaller than 70 and not greater than 140.

<Application>

Battery 1000 in the present embodiment is expected to achieve both of suppression of increase in temperature of the battery on the occurrence of an abnormality and suppression of increase in resistance of the battery during normal use. Applications in which such characteristics are made use of include, for example, a power supply for driving for a hybrid vehicle (HV), a plug-in hybrid vehicle (PHV), an electric vehicle (EV), and the like. Applications of battery 1000 in the present embodiment should not be limited to car-mounted applications. Battery 1000 in the present embodiment can be applied to each and every application.

EXAMPLES

Examples of the present disclosure will be described below. The description below does not limit the scope of claims.

Example 1

1. Preparation of Positive Electrode Plate
Materials below were prepared.
Positive electrode active material: NCM
Conductive material: AB
Binder: PVDF
Flame retardant: diammonium phosphate (thermal decomposition temperature: 150° C.)
Solvent: N-methyl-2-pyrrolidone (NMP)
Positive electrode current collector: Al foil (a thickness of 15 μm and a width dimension=130 mm)

A paste was prepared by mixing NCM, AB, PVDF, diammonium phosphate, and NMP. A ratio of mixing was set to "NCM:AB:PVDF:diammonium phosphate=94:1:1:4" at a mass ratio. Positive electrode composite material layer 102 was formed by applying the paste to a surface of positive electrode current collector 101 and drying the paste. Positive electrode composite material layer 102 (dried, on one surface) had a weight per unit area of 25 mg/cm$^2$. Positive electrode composite material layer 102 had a width dimension of 110 mm. A concentration of P contained in positive electrode composite material layer 102 was set to 1 mass %, a concentration of S was set to 0 mass %, and a porosity of positive electrode composite material layer 102 was set to 40%. Namely, a value (B/A) calculated by dividing porosity B (%) of positive electrode composite material layer 102 by content A (mass %) of P and S contained in positive electrode composite material layer 102 was 40.

Positive electrode composite material layer 102 and positive electrode current collector 101 were compressed with a roller. Positive electrode plate 100 was prepared as set forth above.

2. Preparation of Negative Electrode Plate
Negative electrode material: natural graphite particles (particle size (D50): 25 μm)
Thickener: CMC
Binder: SBR
Solvent: water
Negative electrode current collection foil: Cu foil (a thickness of 10 μm and a width dimension=132 mm)

Slurry was prepared by introducing natural graphite particles, CMC, SBR, and water into an agitation chamber of an agitation apparatus and agitating them. The slurry was applied to a surface of negative electrode current collector 201 and thereafter dried. Negative electrode composite material layer 202 was thus formed. Negative electrode composite material layer 202 (dried, on one surface) had a weight per unit area of 20 mg/cm$^2$. Negative electrode composite material layer 202 had a width dimension of 112 mm.

Negative electrode composite material layer 202 and negative electrode current collector 201 were compressed with a roller. Negative electrode plate 200 was prepared as set forth above.

3. Preparation of Separator
Materials below were prepared.
Heat-resistant material: alumina
Binder: ethylene-acrylic acid ester copolymer
Solvent: water
Separator: porous film composed of PE (a thickness=20 μm and a width dimension=120 mm)

Slurry was prepared by mixing alumina, the ethylene-acrylic acid ester copolymer, and water. A heat-resistant layer was formed by applying the slurry to a surface of separator 300 and drying the slurry. The heat-resistant layer had a thickness of 4 μm. Separator 300 was prepared as set forth above.

4. Preparation of Electrolyte Solution
An electrolyte solution was prepared. The electrolyte solution was composed as below and a thermal decomposition end temperature of the electrolyte solution was 220° C.
Supporting salt: LiPF$_6$ (1 mol/l)
Solvent: [EC:EMC:DEC=1:4:5 (at a volume ratio)]

5. Assembly

Positive electrode plate 100, separator 300, negative electrode plate 200, and separator 300 were stacked in this order and spirally wound. Electrode group 500 was thus formed.

Prismatic case 1001 was prepared. Case 1001 was made of an aluminum alloy. Case 1001 had outer dimensions of a height dimension (75 mm)×a width dimension (120 mm)×a depth dimension (15 mm). The height dimension refers to a dimension in a direction of the z axis in FIG. 1. The width dimension refers to a dimension in a direction of the x axis in FIG. 1. The depth dimension refers to a dimension in a direction of they axis in FIG. 1. Case 1001 had a thickness of 1 mm.

Electrode group 500 was accommodated in case 1001. The electrolyte solution was introduced into case 1001. Case 1001 was hermetically sealed by lid 1003. Battery 1000 according to Example 1 (a lithium ion secondary battery in a prismatic shape) was manufactured as set forth above. Battery 1000 was designed to have a rated capacity of 5 Ah within a range from 3.0 to 4.1 V.

6. Initial Charging and Discharging

Battery 1000 was charged to 4.2 V at a current rate of 1 C in an environment at 25° C. A current rate of "1 C" refers to a rate of a current with which charging to a rated capacity is done in one hour. With a rest for five minutes being interposed, battery 1000 was discharged to 3.0 V at a current rate of 1 C.

An initial capacity of battery 1000 was confirmed by constant current-constant voltage (CC-CV) mode charging and CC-CV mode discharging below.

CC-CV mode charging: CC=1 C, CV=4.1 V, 0.01 C cut
CC-CV mode discharging: CC=1 C, CV=3.0 V, 0.01 C cut Examples 2 to 12

Battery 1000 was manufactured as in Example 1 except for change in value (B/A) calculated by dividing porosity B (%) of positive electrode composite material layer 102 by content A (mass %) of P and S contained in positive electrode composite material layer 102 as shown in Table 1 below.

Examples 13 to 16

Battery 1000 was manufactured as in Example 1 except for change in flame retardant contained in positive electrode composite material layer 102 and change in difference between thermal decomposition end temperature X of the electrolyte solution and thermal decomposition temperature Y of the flame retardant (which will simply also be denoted as "X–Y" below) as shown in Table 1 below.

Example 17

Battery 1000 was manufactured as in Example 1 except for change in flame retardant contained in positive electrode composite material layer 102, change in composition of the electrolyte solution, and change in X–Y as shown in Table 1 below.

Example 18

Battery 1000 was manufactured as in Example 1 except for change in flame retardant contained in the positive electrode composite material layer and change in composition of the electrolyte solution as shown in Table 1 below.

Example 19

Battery 1000 was manufactured as in Example 1 except for change in positive electrode active material contained in positive electrode composite material layer 102 as shown in Table 1 below.

Comparative Examples 1 to 4

Battery 1000 was manufactured as in Example 1 except for change in B/A as shown in Table 1 below.

Comparative Example 5

Battery 1000 was manufactured as in Example 1 except for change in positive electrode active material contained in positive electrode composite material layer 102 and change in B/A as shown in Table 1 below.

Comparative Example 6

Battery 1000 was manufactured as in Example 1 except for change in flame retardant contained in positive electrode composite material layer 102 and change in X–Y as shown in Table 1 below.

<Evaluation>

«Test by Nailing»

A state of charge (SOC) of battery 1000 was adjusted to 100%. A nail was prepared. The nail had a diameter in a body portion of 3 mm and had a tip end portion R of 1 mm. A thermocouple was attached to a surface of battery 1000 and battery 1000 was heated to 60° C. The nail was driven into battery 1000 at a rate of 1 mm/s to forcibly cause internal short-circuiting. A temperature of the battery at the surface of the battery (a location distant from the nail by 1 cm) one second after short-circuiting was measured with the thermocouple and evaluated. Results are shown in the field of "reached temperature" in Table 1 below. A lower reached temperature indicates further suppression of increase in temperature of the battery on the occurrence of an abnormality.

«Battery Resistance Measurement Test»

An SOC of battery 1000 was adjusted to 50%. In an environment at 25° C., battery 1000 was discharged for ten seconds at a current rate of 10 C. An amount of lowering in voltage ten seconds after start of discharging was measured. A resistance of the battery was calculated based on relation between an amount of lowering in voltage and a current rate. Results are shown in the field of "resistance of battery" in Table 1 below. It is considered that, as the resistance of the battery is lower, a resistance of the battery during normal use is lower (that is, increase in resistance of the battery during normal use is suppressed).

TABLE 1

| | Flame Retardant | Positive Electrode Active Material | Thermal Decomposition Temperature of Flame Retardant (° C.) | B/A | Composition of Electrolyte Solution [EC/EMC/DEC] | X-Y | Reached Temperature ° C. | Resistance of Battery [mΩ] |
|---|---|---|---|---|---|---|---|---|
| Example 1 | Diammonium Phosphate | NCM | 150 | 40 | 1/4/5 | 70 | 320 | 3.5 |
| Example 2 | Diammonium Phosphate | NCM | 150 | 13 | 1/4/5 | 70 | 300 | 3.5 |
| Example 3 | Diammonium Phosphate | NCM | 150 | 8 | 1/4/5 | 70 | 290 | 3.55 |
| Example 4 | Diammonium Phosphate | NCM | 150 | 5 | 1/4/5 | 70 | 280 | 3.7 |
| Example 5 | Diammonium Phosphate | NCM | 150 | 400 | 1/4/5 | 70 | 350 | 3.5 |
| Example 6 | Diammonium Phosphate | NCM | 150 | 5000 | 1/4/5 | 70 | 390 | 3.5 |
| Example 7 | Diammonium Phosphate | NCM | 150 | 20 | 1/4/5 | 70 | 310 | 3.5 |
| Example 8 | Diammonium Phosphate | NCM | 150 | 2500 | 1/4/5 | 70 | 380 | 3.5 |
| Example 9 | Diammonium Phosphate | NCM | 150 | 5000 | 1/4/5 | 70 | 390 | 3.5 |
| Example 10 | Diammonium Phosphate | NCM | 150 | 60 | 1/4/5 | 70 | 330 | 3.5 |
| Example 11 | Diammonium Phosphate | NCM | 150 | 8 | 1/4/5 | 70 | 285 | 3.55 |
| Example 12 | Diammonium Phosphate | NCM | 150 | 5 | 1/4/5 | 70 | 280 | 3.7 |
| Example 13 | Guanidine Sulfamate | NCM | 190 | 40 | 1/4/5 | 30 | 330 | 3.5 |
| Example 14 | $(C_4H_9)_3PO$ | NCM | 80 | 40 | 1/4/5 | 140 | 290 | 3.5 |
| Example 15 | $(HO-C_3H_6)_3PO$ | NCM | 110 | 40 | 1/4/5 | 110 | 300 | 3.5 |
| Example 16 | Ammonium Sulfamate | NCM | 210 | 40 | 1/4/5 | 10 | 350 | 3.5 |
| Example 17 | $(C_4H_9)_3PO$ | NCM | 80 | 40 | 0/10/0 | 20 | 340 | 3.5 |
| Example 18 | $(C_4H_9)_3PO$ | NCM | 80 | 40 | 3/0/7 | 70 | 320 | 3.5 |
| Example 19 | Diammonium Phosphate | NCM (8/1/1) | 150 | 40 | 1/4/5 | 70 | 320 | 3.5 |
| Comparative Example 1 | Diammonium Phosphate | NCM | 150 | 5714 | 1/4/5 | 70 | 500 | 3.5 |
| Comparative Example 2 | Diammonium Phosphate | NCM | 150 | 4 | 1/4/5 | 70 | 275 | 6.2 |
| Comparative Example 3 | Diammonium Phosphate | NCM | 150 | 6667 | 1/4/5 | 70 | 700 | 3.7 |
| Comparative Example 4 | Diammonium Phosphate | NCM | 150 | 4 | 1/4/5 | 70 | 275 | 6.0 |
| Comparative Example 5 | Diammonium Phosphate | NCM (8/1/1) | 150 | 5714 | 1/4/5 | 70 | 650 | 3.5 |
| Comparative Example 6 | MPP | NCM | 320 | 40 | 1/4/5 | -100 | 500 | 3.5 |

<Results>

As shown in Table 1 above, Examples 1 to 19 which satisfied all of conditions (A) to (C) below achieved both of suppression of increase in temperature of the battery on the occurrence of an abnormality (when a nail was driven) and suppression of increase in resistance of the battery during normal use.

(A) Positive electrode plate 100 includes positive electrode composite material layer 102, and positive electrode composite material layer 102 contains at least a positive electrode active material and a flame retardant.

(B) The flame retardant contains phosphorus (P) or sulfur (S) and has a thermal decomposition temperature not lower than 80° C. and not higher than 210° C.

(C) A value calculated by dividing porosity B (%) of positive electrode composite material layer 102 by content A (mass %) of P and S contained in positive electrode composite material layer 102 is not smaller than 5 and not greater than 5000.

It is considered that, by satisfying the condition (B), a fire retardant mechanism attributed to the flame retardant was activated before the positive electrode active material was thermally decomposed. It is thus considered that increase in temperature of the battery on the occurrence of an abnormality was suppressed.

It is considered that, by satisfying the condition (C), an appropriate amount of electrolyte solution was contained in battery 1000 and an appropriate amount of P and S was contained in positive electrode composite material layer 102. It is thus considered that both of suppression of increase in temperature of the battery on the occurrence of an abnormality (when a nail was driven) and suppression of increase in resistance of the battery during normal use were achieved.

It was shown in the results in Comparative Examples 2 and 4 that, when the conditions (A) and (B) were satisfied but when B/A was smaller than 5 (when the condition (C) was not satisfied), there is a room for improvement in suppression of increase in resistance of the battery during normal use. It is considered that an amount of P and S present in positive electrode composite material layer 102 was excessive, and hence P and S functioned as an insulator and a resistance of the battery increased. Alternatively, a porosity of positive electrode composite material layer 102 might have been too low and an amount of permeation of lithium ions into the electrolyte solution might have been insufficient.

It was shown in the results in Comparative Examples 1 and 3 that, when the conditions (A) and (B) were satisfied but B/A exceeded 5000 (that is, the condition (C) was not satisfied), there is a room for improvement in suppression of increase in temperature of the battery on the occurrence of an abnormality. It is considered that an amount of flame retardant in positive electrode composite material layer 102 was excessively small or an amount of electrolyte solution was excessively large, and hence a sufficient effect of suppression of heat generation was not obtained.

It is found from the results in Example 19 and Comparative Example 5 that, when the conditions (A) to (C) were satisfied and also when nickel in the positive electrode active material was increased, both of suppression of increase in temperature of the battery on the occurrence of an abnormality (when a nail was driven) and suppression of increase in resistance of the battery during normal use were achieved. It is considered that the flame retardant was thermally decomposed before reaching the thermal decomposition temperature of the positive electrode active material and heat generation by the battery was suppressed.

It was confirmed in Table 1 that both of suppression of increase in temperature of the battery on the occurrence of an abnormality (when a nail was driven) and suppression of increase in resistance of the battery during normal use were achieved by adopting at least one salt selected from the group consisting of diammonium phosphate, guanidine sulfamate, ammonium sulfamate, (($C_4H_9$)$_3$PO), and (HO—$C_3H_6$)$_3$PO as the flame retardant. In contrast, it was shown in Comparative Example 6 in which MPP was adopted as the flame retardant that there is a room for improvement in suppression of increase in temperature of the battery. It is considered that, since the thermal decomposition temperature of MPP is as high as 320° C., the positive electrode active material was thermally decomposed at a temperature lower than the temperature at which MPP was thermally decomposed. Therefore, suppression of increase in temperature of the battery is considered as insufficient.

It was shown in the results in Table 1 that X–Y was desirably not smaller than 10 and not greater than 140, more desirably not smaller than 20 and not greater than 140, further desirably not smaller than 30 and not greater than 140, and particularly desirably not smaller than 70 and not greater than 140, with X representing a thermal decomposition end temperature of the electrolyte solution and Y representing a thermal decomposition temperature of the flame retardant. It is considered that, since a difference between the thermal decomposition end temperature of the electrolyte solution and the thermal decomposition temperature of the flame retardant was appropriate in Examples 1 to 19, increase in temperature of the battery on the occurrence of an abnormality was further suppressed.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A positive electrode plate for a non-aqueous electrolyte secondary battery comprising:
    a positive electrode composite material layer,
    the positive electrode composite material layer containing at least a positive electrode active material and a flame retardant,
    the flame retardant containing phosphorus (P) or sulfur (S),
    the flame retardant having a thermal decomposition temperature not lower than 80° C. and not higher than 210° C., and
    a value calculated by dividing a porosity (%) of the positive electrode composite material layer by an amount (mass %) of P and S contained in the positive electrode composite material layer being not smaller than 5 and not greater than 5000,
    wherein the flame retardant is at least one selected from the group consisting of diammonium phosphate, guanidine sulfamate, ammonium sulfamate, (($C_4H_9$)$_3$PO, and (HO—$C_3H_6$)$_3$PO.

2. A non-aqueous electrolyte secondary battery comprising at least the positive electrode plate according to claim 1.

3. The non-aqueous electrolyte secondary battery according to claim 2, the non-aqueous electrolyte secondary battery comprising an electrolyte solution.

4. The non-aqueous electrolyte secondary battery according to claim 2, wherein
    a relational expression (1) below is satisfied:

$$10 \leq X-Y \leq 140 \tag{1}$$

where X represents a thermal decomposition end temperature of an electrolyte solution and Y represents a thermal decomposition temperature of the flame retardant.

* * * * *